(12) United States Patent
Ashenmil et al.

(10) Patent No.: US 6,615,187 B1
(45) Date of Patent: Sep. 2, 2003

(54) METHOD OF SECURITIZING AND TRADING REAL ESTATE BROKERAGE OPTIONS

(76) Inventors: Warren S. Ashenmil, 455 E. 86$^{th}$ St., #17B, New York, NY (US) 10028; Daniel S. Berns, 2040 Franklin St., #504, San Francisco, CA (US) 94109; John W. Drury, P.O. Box 12324, Aspen, CO (US) 81612

( * ) Notice: Subject to any disclaimer, the term of this patent is extended or adjusted under 35 U.S.C. 154(b) by 0 days.

(21) Appl. No.: 09/501,261

(22) Filed: Feb. 9, 2000

(51) Int. Cl.$^7$ ................................................ G06F 17/60
(52) U.S. Cl. ............................ 705/35; 705/36; 705/37; 705/38; 705/39; 705/1
(58) Field of Search ............................. 705/35, 36, 37, 705/38, 1, 14, 39

(56) References Cited

U.S. PATENT DOCUMENTS

| | | | | |
|---|---|---|---|---|
| 5,083,270 A | * | 1/1992 | Gross et al. ................. | 705/35 |
| 5,500,793 A | * | 3/1996 | Deming et al. ............... | 705/10 |
| 5,636,117 A | * | 6/1997 | Rothstein ..................... | 705/38 |
| 5,664,115 A | * | 9/1997 | Fraser ......................... | 705/37 |
| 5,802,501 A | * | 9/1998 | Graff ........................... | 705/36 |
| 5,809,484 A | * | 9/1998 | Mottola et al. ............... | 705/38 |
| 5,926,800 A | * | 7/1999 | Baronowski et al. ......... | 705/35 |
| 5,950,175 A | * | 9/1999 | Austin ......................... | 705/35 |
| 5,970,480 A | * | 10/1999 | Kalina ......................... | 705/37 |
| 5,987,435 A | * | 11/1999 | Weiss et al. ................. | 705/36 |
| 6,012,047 A | * | 1/2000 | Mazonas et al. ............. | 705/38 |
| 6,067,533 A | * | 5/2000 | McCauley et al. ............ | 705/38 |
| 6,292,788 B1 | * | 9/2001 | Roberts et al. ............... | 705/35 |

FOREIGN PATENT DOCUMENTS

| | | | |
|---|---|---|---|
| CA | 2285716 | * | 4/2000 |
| JP | 406301706 | * | 10/1994 |
| JP | 10-326317 | * | 12/1998 |
| WO | WO 99/46658 | * | 9/1999 |

OTHER PUBLICATIONS

Robert Gertner and Andrew Rosenfield; "How real options lead to better decisions"; Oct. 25, 1999; Financial Times, London; 7 pages.*

Jaskiewicz, Stanley; "Bidding Auctioneers: Negotiating An Agreement"; Jun. 1999; Journal of Trusts and Estates; Vol 130, No. 6 pp. 71–72.*

John Downes, Editor; Dictionary of Finance and Investment Terms; 1998, p17.*

Cornwell, T., "$200 million 'excess' MBS" National Mortgage News, vol. 24, No. 11, pp. 1, 10 (2 pages), Nov. 1999.*

* cited by examiner

*Primary Examiner*—Vincent Millin
*Assistant Examiner*—Alain L. Bashore
(74) *Attorney, Agent, or Firm*—Howrey Simon Arnold & White, LLP

(57) ABSTRACT

The present invention relates to a method of creating, purchasing and selling the real estate brokerage commissions typically collected upon the sale of real property. A property owner sells, for a certain consideration, the assignable option to be the owner's broker when the owner decides to resell the property. The compensation paid may be in the form of cash or an equivalent incentive. The option has an expected return associated with it that will vary depending upon a number of factors including, but not limited to, the value of the property and the predicted amount of brokerage commission to be earned upon resale of the property. The option can be sold through securitization or some other method. The option can also become a traded commodity and form the basis for a real estate options and futures market.

61 Claims, No Drawings

METHOD OF SECURITIZING AND TRADING REAL ESTATE BROKERAGE OPTIONS

FIELD OF THE INVENTION

The present invention relates to a process for monetizing an aspect of the real estate sale transaction and a method of speculating on real estate values. Particularly, the invention relates to a method of securitizing the brokerage fees typically collected upon the sale of commercial and residential real estate, and trading these brokerage fees by creating a futures and options market based on the value of these brokerage fees.

BACKGROUND OF THE INVENTION

Millions of new and existing homes are sold each year in the United States. The residential mortgage market in itself is a trillion dollar industry. However, one of the largest obstacles to purchasing a home is amassing the relatively large amount of cash needed for up-front closing costs. Large downpayments and closing costs prevent many potential homeowners from being able to buy a home, even at attractive mortgage rates. Therefore, the need exists to develop a financial vehicle and method of selling real estate that can alleviate some of the burden faced by potential home purchasers.

The most common and critical function which facilitates the sale of real estate so that, for example, home buyers can purchase homes and home sellers can, in turn, also buy homes, is the brokerage function. The brokerage function is the process whereby real estate agents represent and assist buyers and sellers of real estate in their searches and transactions associated with finding a suitable property and effecting a transfer of ownership. While property prices, characteristics, and other functions can vary widely from one real estate transaction to another, the brokerage function and the commission earned by the broker for that service (typically 6% of the sale price in the United States) remain constant. However, despite its importance and constancy, the brokerage function remains one of the least efficient, underutilized, and improperly valued aspects of the real estate market. Therefore, a need exists for a method of using the real estate brokerage function and, more specifically, broker commissions as a tracker of real estate values, an investment opportunity, a method of easing the closing cost burden on purchasers, and for various other purposes.

During the 1970s, Wall Street developed and popularized new techniques for financing home purchases by providing capital to fund the purchase of residential mortgages. Banks and Savings & Loans were no longer required to fund and hold the hundreds of billions of dollars of mortgages being originated each year. Instead, the securities industry perfected techniques to pool millions of mortgages and sell them in pools to financial investors. Liquidity was injected into the mortgage system, economies of scale were achieved, rates to borrowers decreased as pools spread out risk and made capital more readily available, and a trillion dollar industry emerged. The securities industry acted as the conduit for buying, pooling, and re-selling mortgages.

The benefits of financing mortgages through the pooling of originated loans and selling them in tranches (prioritized, individually priced, and credit-rated segments) to sophisticated investors are now well proven. The real estate market has seen hundreds of billions of dollars in capital become available through securitizing mortgages. The real estate market has been infused with new capital and increased liquidity. As a result, more Americans have been enabled to buy real estate at better interest rates.

In the past 30 years, securitization—the technique of financing cash flows generated from individual or pooled assets such as residential mortgages—has also been used to finance numerous other statistically-predictable cash flows. Examples of such statistically-predictable cash flows include commercial real estate mortgages; oil, power, and telecommunications accounts receivables; cross-border earning remittances; credit card payments; and retail accounts receivables. Securitization enables investors to invest in securities with a calculated risk/reward profile commensurate with their goals and objectives. Rating agencies assess the relative risk profile of each transaction and rate the different tranches of securities, providing various levels of returns for investors. Securitization, as a financing and investor vehicle, has become a trillion dollar business in this country and is gaining popularity overseas. It is the perfect investment tool when historical information is available. Statistical analysis can be used to gauge risk and return, and large volumes of securities can be amassed to achieve economies of scale and lower costs while increasing returns.

Pools of future cash flows can be securitized so long as the cash flows have been engineered to conform to pre-established standards, and investors can statistically determine the payment characteristics of the cash flows so that the various tranches can be sold at rates commensurate with the investment's risk. The aggregation of large pools of cash flows enables statistical analysis by rating agencies and sophisticated investors leading to standardized ratings and buying levels. Commercial properties are also financed using this technique. Even construction and interim loans can be financed using securitization. In today's economy, securitization can be used to finance any cash flow that can be statistically measured by investors who will be able to assign a risk level to the timing and probability of receiving such cash flow.

Since the brokerage function is a necessity in most real estate transactions, and since the associated brokerage commissions are predictable, they lend themselves perfectly to the securitization process. Information on factors such as average time to sell a property, time on the market, median and average property prices, and commissions earned are all readily available and can be used by rating agencies, investment bankers, and investors to structure such transactions. As such, the timing of the sales commission, the amount of the commission, the value of the income stream, and the likelihood of income realization can all be statistically projected using the plethora of historical information available from government institutions and other recognized sources. As a result, a new process may be developed to serve real estate buyers and sellers whereby the right to future real estate brokerage commissions (hereinafter referred to as the "Real Estate Brokerage Option" or "REBO") can be purchased, assigned, sold, and traded.

The REBO would be purchased from the natural holder of that right, namely the existing property owner. Moreover, that right can be purchased in exchange for compensation at the time when the owner needs it most, namely when he or she is purchasing the property or soon thereafter (although the right may be purchased at any time during the owner's ownership of the property). Moreover, the compensation may take any of a wide variety of forms acceptable to the owner.

Given the predictability of the future value of brokerage commissions and their utility as a valid real-time measure of property value, the process of securitization can be used to "monetize" the value of future brokerage fees in the present. In other words, brokerage commissions to be earned in the future can be converted to securities with a present-day cash value. The amount of the actual compensation necessary to acquire a particular REBO will vary depending upon factors such as the value of the property at the time the REBO is purchased, the statistically predictable time to resale, and the statistically predictable future value of the acquired REBO, among others; but is ultimately a future cash flow that can be estimated within an acceptable degree of statistical certainty. As such, the REBO lends itself well to the asset-backed securitization process and provides a financial vehicle capable of many benefits including assisting real estate property buyers in funding their new purchases and providing new investment opportunities for investors to diversify their portfolios.

SUMMARY OF THE INVENTION

The present invention relates to a process involving the buying and selling of real estate. Particularly, the invention relates to both a method of securitizing the real estate brokerage commissions typically collected upon the sale of real property, and a method for trading securities derived from these commissions through the creation of a related futures and options market.

In one aspect of the present invention, an investor purchases from a real estate property owner, for a fixed sum, the assignable right to be the owner's sales broker when the owner decides to sell the property. The compensation paid may be in the form of cash or an equivalent non-cash incentive. The amount of the option premium paid to the owner will vary depending upon a number of factors including, but not limited to, the value of the property and the predicted amount of brokerage commission to be earned upon resale of the property. To ensure that the owner fulfills his obligation to pay the eventual brokerage fee to the REBO owner in the event the property owner sells the property, a notarized document may be signed and recorded in public records (e.g., by attachment to the deed of the property) so that no sale of the property could be consummated without the REBO owner being notified and compensated as required by the agreement.

Of course, the property owner has the right to decide whether he will sell the property and when he will do so. There need not be an obligation on the property owner to sell the property. However, once the property owner decides to sell the property, the REBO owner will be informed, for example, by the property seller or by the new mortgage lender that the property has been sold and that the parties wish to satisfy their obligation to the REBO owner to remove the encumbrance on the property. The owner of the REBO ultimately receives the brokerage commission once the contracted-for brokerage services have been supplied, either by the REBO owner or by a third party on behalf of the REBO owner.

In another aspect of the invention, the REBO may be assembled into a pool with other REBOs for purposes of risk allocation and investment diversification. A pool of REBOs may contain REBOs from a specific area such as a particular city, county, state, or region; or the pool may contain REBOs diversified by geographic location, estimated selling price, estimated date of sale, or other factors alone or in combination. Then, pursuant to the principles of securitization as detailed above, pools of REBOs may be assessed, valued, and sold in tranches to various investors. The tranches will each have to be valued and rated before being issued. Accordingly, the process and advantages of securitization can be applied to the brokerage commission function to provide property purchasers with money today for a service to be rendered in the future. Consequently, property purchasers are served by having some of their burdensome transaction costs defrayed, while the pooling of REBOs along with well-known securitization techniques allows investors to diversify by investing in a new type of security with a predictable risk/reward calculation.

Yet another aspect of the invention involves the creation of a real estate futures and options market. Derivative instruments are created whose value preferably approximates the real estate values underlying the REBOs. The values of these instruments will rise and fall with the values of the associated real estate assets, thereby providing investors with a cost-effective way to invest in the real estate market, real estate owners with the ability to protect their investments, and speculators with the ability to make directional speculations on the value of real estate.

The proposed invention satisfies the needs of a variety of parties. First, new home purchasers are benefited by the creation of a financial vehicle that alleviates some of the financial burden associated with purchasing a new home. In addition, the proposed invention benefits homeowners and other property purchasers since it will likely lead to the commoditization of the brokerage function and, inevitably, to lower brokerage fees.

Mortgage loan originators, including commercial banks, finance companies, and thrifts, are also benefited in a number of ways. By purchasing, investing in, and trading brokerage fee options, a mortgage lender could, for example, offer existing clients various methods to turn their REBOs into cash at the time of loan origination (for example, a lender could offer a borrower a cash rebate at the time of loan origination in exchange for selling the REBO), thus creating future profit opportunity for the lender. Mortgage lenders could also broaden internal cross-marketing opportunities by offering the product through existing internal programs (such as credit card clients, depositor clients, etc.), and capture new external market share by purchasing REBOs from mortgage clients of competitors. This would provide the ancillary benefit of establishing a new lending/banking relationship with new clients. Finally, a mortgage lender could resell acquired REBOs at a profit to others, such as the existing brokerage community, speculators, insurance companies, and competitor institutions.

In each case, the entity that creates or purchases REBOs accesses a future stream of predictable revenue and profits. That entity is further able to cross-sell existing products to both existing clients and new clients, creating a substantially larger potential client pool. Additionally, to the extent such an entity may become inclined to enter the brokerage business (whether through acquisition of a brokerage service provider or otherwise), it can vertically integrate the organizations, thus moving itself to a position closer to its customer base. Finally, as a potential ancillary benefit, such an entity could generate substantial predictable mergers and acquisitions fees by advising existing brokerage firms and potential acquirers who will either choose or be forced to merge as a means of increasing their capital base in order to compete once this new capital markets product is introduced.

Real estate brokerage companies could also benefit from the present invention since the REBO would allow them to gain access to a new source of brokerage assignments and fees. Finally, investors will inevitably benefit by creation of the REBO and the resulting trading of REBOs because investors are always seeking new investment vehicles to diversify their portfolios. Furthermore, securitization of brokerage fees and the creation of a brokerage fee futures and options market will provide investors with more opportunities and alternatives. Other features and advantages of the present invention will become apparent in the following detailed description.

DETAILED DESCRIPTION OF THE PREFERRED EMBODIMENTS

Reference will now be made in detail to the preferred embodiments of the invention, examples of which are also provided in the following description. Exemplary embodiments of this invention are described in some detail, although it will be apparent to those skilled in the relevant art that some features which are not particularly relevant to the invention may not be shown for the sake of clarity. Although the present invention contemplates a wide variety of applications involving transactions that are facilitated by brokers in exchange for a commission, the preferred embodiments involve real estate transactions, and more particularly, residential real estate transactions such as home sales. Therefore, the examples provided below are primarily given in the context of residential home sales. Nevertheless, it should be obvious that the invention also contemplates commercial real estate transaction and non-real estate applications.

Real estate brokers offer their services for assisting would-be home owners in finding an acceptable new home and structuring an acceptable transaction for transfer of ownership of the new home. In exchange for that service, brokers in the United States typically charge a brokerage commission on the order of 6 percent of the final sale price. The brokerage commission is negotiable between the parties at the time they contract for the service, and the standard rate may vary in other countries. The full commission is usually paid by the seller to his or her broker ("the seller's agent"), although the commission may be calculated into the agreed-upon sale price of the home. If the home buyer is also represented by a broker ("the buyer's agent"), the seller's agent usually splits the commission with the buyer's agent, resulting in each agent receiving a 3 percent commission. Sellers of real property are not required to enlist an agent to represent them; however, many do.

In the preferred embodiment, an investor purchases from an owner of a real property the right to be the owner's selling agent when the owner decides to sell the property. For the purposes of this disclosure, this option is referred to herein as the "Real Estate Brokerage Option," or "REBO." Preferably, the real property at issue is a residential home. However, the present invention is not necessarily so limited. Rather, the property may comprise land and or structures, residential and/or commercial properties. Furthermore, the property need not necessarily be a real property. For example, the principles of the present invention apply equally as well to, for example, business and intellectual property transactions. However, for the purposes of this disclosure, the details of the invention are presented in the context of new home purchases.

The REBO may be purchased at any time during the owner's ownership of the property, but preferably occurs at the time the owner first purchases the property or soon thereafter. In the example of a new home purchase, it may be particularly advantageous to a new home purchaser to receive, for example, cash at the time of closing, when cash is most needed. The property owner is the only true holder of the option because only the true owner may sell the property. Therefore, the REBO must be purchased from the true owner. The REBO, however, may be purchased at the time the true owner attains ownership (i.e., at closing of the original purchase), as well as at any time during ownership. Accordingly, various state real property laws and regulations may need to be satisfied. For example, it may need to be determined whether a given property is owned by multiple owners as joint tenants or tenants-in-common. It may also be necessary to determine whether there is a mortgage holder with an interest that must be satisfied.

The REBO may be purchased as an assignable right. Once again, state property, contract, and other laws and regulations may need to be satisfied. However, purchasing the REBO as an assignable right provides the REBO purchaser the opportunity to convey the right to another party, if he so desires. Moreover, the REBO should be assignable if it is to become a traded commodity, as will be discussed below. Methods for securitizing and trading a REBO will also be discussed in detail below.

The REBO transaction may also occur, at least partially, via the internet. Recent years have seen the internet become an increasingly useful facilitator of transactions such as in investing, banking, and mortgage lending. Prospective home buyers, for example, can "go online" to apply for mortgages via the internet through a bank's website. Therefore, the internet can be used to facilitate the REBO process by, for example, informing property owners and prospective owners of its existence and benefits, providing property owners with the opportunity to sell a REBO to an investor over the internet, and providing a forum for investors to buy and sell REBOs.

The consideration paid to the property owner in exchange for the right is preferably cash. As stated above, most new home purchasers are particularly in need of cash at the time of closing and soon thereafter. However, the consideration may take a wide variety of forms. For example, the property owner may be offered compensation related to a credit card, such as a rebate, account credit, or "bonus points" which entitle the account holder to various benefits. In another embodiment of the present invention, the owner may be offered a mortgage-related incentive such as a reduced loan rate, a credit in mortgage payments, a grace period without mortgage payments, or reduced transactional fees. Alternatively, property owners may be offered a travel-related incentive such as "frequent flier miles," vacations, and other benefits. In another embodiment, owners may be offered credit redeemable towards certain designated goods and/or services. Obviously, there are many forms the consideration may take that would be acceptable to the owner. The present invention is not limited to any particular form, type, or amount of compensation.

It should be noted that the right purchased represents the right to represent the owner of the property when that owner decides to sell the property. There need not be an obligation on the property owner to sell. An owner may sell the REBO to an investor but retain the property forever. As such the contract between the property owner and the REBO purchaser in the preferred embodiment is, in the language of the law, a contract subject to a condition precedent, wherein the condition is the owner's decision to sell the property. The owner must decide to sell the property before any duty to perform arises. If the owner never decides to sell the property, the REBO owner's right does not vest and the property owner is under no obligation to compensate the REBO owner. Consequently, there is inherent in the REBO a risk that the benefit for the investor will never materialize. However, such is the nature of investing and it is reasonable to expect that all investors are keenly aware of the possibility of losing their investment without positive return.

To ensure that the property owner fulfills his obligation to the REBO owner when the property is sold, in the preferred embodiment, a document is signed by the parties at the time the REBO is purchased. The document, which may be notarized, may be recorded in public records along with the property records such as the title. Local laws may vary with respect to the contents and restrictions of such a document, notarizing requirements, and recordation requirements and procedures. Consequently, applicable local laws should be considered. The REBO document would then appear in any title search as a cloud on the property title requiring satisfaction before ownership of the property may be validly transferred. As a result, the owner would find it difficult to sell the property without satisfying his obligation under the REBO. The REBO owner would be notified by, for example, one of the parties to the sale or a lending institution that the property was being conveyed. The REBO owner could then be compensated and the title cleared.

The written agreement that forms the basis of the REBO may take a wide variety of forms, within the parameters of applicable law, and the present invention is not limited to any one specific form of agreement, nor is it limited to any particular choice of language. There are a great many provisions that may be incorporated into the written REBO contract. Among the provisions that may optionally be included is a provision governing whether the REBO transfers with the property in the event the owner bequeaths the property to his heirs instead of selling it (i.e., whether the owner's heirs are bound by the terms of the REBO). The agreement may also contain a provision regarding the property owner's right to decline any brokerage services in favor of representing himself.

If the property owner decides to sell the property, the owner of the REBO has the obligation to provide the property owner with seller's representation in exchange for the negotiated brokerage commission. The REBO owner may provide the brokerage service, or may have a third party provide the service on behalf of the REBO owner. For example, the REBO owner may have a list of affiliated brokerage services that have contracted with the REBO owner to provide the brokerage services in exchange for a reduced commission. Moreover, the property owner may be given a choice of affiliated brokers to use, thereby improving the chances that the property owner will be satisfied with the representation he receives.

The value of the consideration paid to the property owner, no matter what form that consideration takes, is an amount that would be determined by the investor. The price to pay for a given REBO will depend on a wide variety of factors including, but not limited to, the value of the underlying property upon which the option is based, the estimated holding period for the property, the predicted sale price of the property when it is sold, the amount of brokerage commission to be earned, and the REBO owner's costs associated with supplying the actual brokerage services (either himself or through a third party). Those factors which cannot be precisely be calculated can be estimated within a reasonable degree of statistical certainty using data from a wide variety of sources. The federal government and most state and local governments collect data regarding property values that is made publicly available. Much of this information is available via the internet through various government internet sites and through private and public organizations' websites. Property value data, for example, can be located for specific properties; local areas such as neighborhoods, cities, and counties; state and regional information showing property values throughout a specific region; and national data showing property values and trends throughout the nation. Such information may also be available from tax records and from various sources that record property sales and associated information. Ample public information is also available regarding average or median holding periods—that is, the time between property sales—for properties in a given area (i.e., local, state, regional, or nationwide), as well as for average and median times that properties listed for sale spend on the market before actually being sold. Many government agencies assemble relevant property-related data including city, county, state, and federal agencies. In addition, other sources such as insurance organizations, non-profit organizations, real estate concerns, and the investment community assemble and make available such data. Therefore, data of varying focus and scope are available from a number of sources. The present invention is not limited to a value analysis that considers only these factors or these sources of information.

As an example, an investor could calculate the predicted return on a REBO by taking the current market value of the underlying property, predicting the estimated holding period based on public data, estimating the future sale price based on property value appreciation trends, and accounting for inflationary costs over the holding period. Mathematically simplified, this analysis equation would be:

$$V_{REBO\ at\ t} = (V_{property\ at\ t} \times C) - (I \times t)$$

Where:

$V_{REBO\ at\ t}$=Predicted gross value of the REBO at time t t=Holding period=estimated time until property is sold $V_{property\ at\ t}$=Predicted value of the property at time t C=Brokerage commission rate (e.g., 6 percent)

I=Rate of inflation.

And where the value of the property at time t ($V_{property\ at\ t}$) can be estimated from the following equation:

$$V_{property\ at\ t} = A \times t$$

Where:

A=Average or predicted rate of appreciation in property values in the given area (e.g., local, statewide, regional, or nationwide).

Of course, this is an elementary calculation that yields an expected gross value for the REBO for exemplary purposes. More sophisticated models may be used to more accurately predict future earnings and to account for expenses such as those associated with rendering the brokerage services and transactional costs, which account for the difference between a gross and a net REBO value. Moreover, the accuracy of any model will depend upon the precision of the data employed. For example, national data may not be as accurate as local data in predicting the value of a particular REBO. Other factors that might be considered in calculating the value of a REBO include the REBO owners costs associated with owning the REBO and ultimately performing the contracted-for brokerage services, home pricing patterns, seasonal variances in property sales, new home construction levels, and other factors. Once the future value of the REBO is calculated, the investor, taking into account his required investment rates of return, can calculate the value of the present-day compensation that should be paid to the property owner to secure the option.

One factor that may also be considered in the calculation of future REBO value and the amount of present-day compensation to be paid is the level of risk associated with the option. As stated above, there is an inherent risk associated with the REBO that the owner will never opt to sell the property. There are also other risks commonly associated with investments, such as the risk of default by the obligor, that may be considered. Models of varying sophistication have been developed to predict risk in different contexts, such as with traded options, mortgage pools, and insurance, and the present invention is not limited to any one method or type of model for predicting risk. As with valuing data, risk data is assembled by a number of sources and usually is made readily available through print and/or the internet. Generally, the risk associated with a specific REBO will be based on a variety of factors, including but not limited to, the likelihood that the property owner will opt not to sell, the possibility that the owner will hold on to the property longer than the predicted holding period, the possibility that property values in the given area will not appreciate substantially or will depreciate, the possibility that inflation could rise substantially, and the possibility that the property could suffer catastrophic damage. These are some of the factors typically considered in an investment risk analysis; however, there are a wide variety of other factors and methods of using those factors to calculate the risk associated with an investment. The present invention is not limited to a risk analysis that considers only these specifically mentioned factors.

In the preferred embodiment, the REBO may be collected with other REBOs to produce a pool of REBOs, thereby diversifying the investment and reducing the overall risk. Since the REBO is an option or contractual right on the part of the REBO owner to receive a future cash flow, it is as easily securitized as any other cash generating asset, such as credit card accounts, home equity loans, and mortgages. Securitizing a REBO or pool of REBOs enables the owner of the REBOs to receive cash in the present for a predicted future cash flow. As such, well-known methods of asset-backed securitization can be applied to the REBO to make it a valuable investment tool.

As with individual REBOs, a pool of REBOs would be valued and analyzed with respect to the risk associated with the investment. The value factors and risk factors associated with individual REBOs also apply to a pool of REBOs overall, however, the analyses may differ. For example, the overall value of a pool of REBOs may be determined by valuing each REBO within the pool individually, as discussed above. However, in some cases, this approach may not be feasible (for example, with a very large pool of REBOs). Therefore, a pool may be valued on a broader scale. For example, an overall pool value may be determined by considering an average, median, or estimated time between property sales; an average, median, or estimated time that properties spend on the market before being sold; and average, median, or estimated rate of appreciation in property values. Furthermore, the data may be of different scopes. For example, a pool of REBOs may be assembled consisting solely or mostly of REBOs on properties in the state of New York. In such a case, data regarding national averages may be useful; however, New York averages would be particularly useful. A pool of REBOs may also be valued by organizing the REBOs within the pool and using data that is particularly focused on each grouping. For example, REBOs within a pool may be sorted geographically (such as by neighborhood, county, city, state, or region), or chronologically (such as by the date the REBO is expected to be realized). A pool which contains REBOs from five different states could then be segmented, for value analysis purposes, by state, and data from each state could be applied to the five segments individually to value the entire pool. This approach may be especially useful if the pool contained a large number of REBOs. Obviously, there are a wide variety of ways to efficiently and accurately assess the value of an entire pool of REBOs, and value models will depend on a great number of factors such as their relative sophistication, expense, data available, etc. Some models may also account for expenses such as the costs of rendering brokerage services, transactional costs, and inflationary costs, that yield a net REBO pool value, rather than a gross value.

Similarly to valuing a pool, the overall risk associated with a pool of REBOs may be determined by assessing the risk of each REBO within the pool individually, or by relying on broader data sets. For example, a pool may be risk analyzed using the average or median value of the individual REBOs and their underlying properties; the predicted number of REBOs within the pool that will actually be realized; the likelihood that individual REBOs, groups of REBOs within the pool, or the entire pool will be realized; an average, median, or estimated time until REBOs will be realized; and predicted rates of property value appreciation. There are other factors that may also be deemed relevant. Moreover, risk factors can also be calculated by grouping REBOs, such as geographically or chronologically as explained above, and using data that focuses on those particular groupings.

The following details are provided regarding the securitization process, assuming that all applicable laws and regulations have been accounted for and complied with. It should be understood that there are many ways to securitize an asset and the following is provided for exemplary purposes. Moreover, certain details well known in the art that are not crucial to the methods of the present invention may not be mentioned for the sake of clarity.

Generally, the securitization process involves accumulating a pool of REBOs and evaluating their characteristics. The relevant characteristics may include property value and location, type of property, and the information discussed above, such as expected rates of appreciation and associated risk. A pool of REBOs may be evaluated by considering each REBO individually, or by considering the pool of REBOs as a whole. Moreover, the pool of REBOs as assembled may be organized in a particular way. For example, the pool may consist of REBOs from a particular county. Therefore, the pool could be valued based upon information such as average property values in the county, typical property appreciation within the county, etc.

Once the pool of REBOs has been analyzed and the relevant characteristics determined, this information is then preferably supplied to a rating agency, such as Moody's Investor's Service or Standard and Poor's. The rating agencies conduct their independent review and analysis, including a risk assessment, and supply preliminary "credit enhancement levels," which state an approximate rating for the investment (e.g., AAA, AA, A, etc.). Based upon the preliminary ratings from the rating agencies, the securitization profit can be estimated.

Once the preliminary credit enhancement levels are obtained, the party seeking securitization of the REBOs may retain one or more rating agencies to officially rate the securitization transaction. Upon completion of the rating agency's analysis of the transaction, the rating agency issues a "final credit enhancement level." As a condition to rating the securitization, the rating agency may require from the party seeking securitization a credit enhancement other than that provided by more senior classes within the transaction such as a cash reserve or third-party guaranty.

Once the rating agency has been satisfied, the party seeking to securitize the REBOs can prepare to offer the securities—the securitized REBOs—to investors. This preparation involves structuring the offering transactions and preparing a prospectus or offering memorandum that details the characteristics of the security in accordance with applicable federal and state securities laws and Securities and Exchange Commission (SEC) regulations. If the options are to be traded on an exchange or commodity market, there may also be rules associated with that forum that would be addressed in the prospectus.

In the preferred embodiment, the REBOs will be sold by the owner of the pool of REBOs to a trust or Real Estate Mortgage Investment Conduit (REMIC) in consideration for cash once the securities are placed with investors. A REMIC is a multiple-class mortgage cash flow security, typically backed by residential or commercial mortgage loans, which generally have been pooled together in a trust. The largest issuers of REMIC securities are Fannie Mae and Freddie Mac. The issuer of the trust or REMIC securities will issue certificates in various classes or tranches with each class being sized according to the final rating agency credit enhancement levels. For example, a $1 billion pool of REBOs may be classified as 30% or $300 million rated as AAA, 20% or 200 million rated as AA, and the remaining 50% or 500 million rated as A. The certificates are then sold to investors, for example, through a public issuance or through a private offering in accordance with federal and state securities laws.

Following the sale of certificates, a trust and servicing agreement, which governs the operation of the trust and the distribution of cash flows to investors, is finalized and the transaction is closed. Investors receive certificates in return for cash investments and the cash gets paid to the party who sold and securitized the REBOs. Once issued, the certificates can be freely traded as with any asset-backed security. The value of the certificates will fluctuate based on the perceived value of the underlying REBO collateral and based upon general market conditions. For example, a report that national new home sales increased substantially last month would, presumably, increase the value of the security in investors' eyes.

REBOs may be traded in a variety of ways. They may be traded individually or in pools; or they may be securitized as detailed above. REBOs, individually or in pools, may be traded such that the REBO owner has to provide the actual brokerage service when the property owner or owners decide to sell. Alternatively, the REBOs may be traded—much like commodities such as oil and pork bellies—whereby the REBO continually changes hands but the actual brokerage service is delivered by an entity that is separate from, but perhaps affiliated with, the actual REBO owner. REBOs can also form the basis of a real estate futures and options market. For example, derivative instruments and contracts whose values fluctuate based upon the value of individual REBOs or pools of REBOs can be created. These instruments and contracts can then be traded on a commodity exchange, much like well known commodities such as oil and pork bellies.

Conclusion

It will be obvious to anyone skilled in the art that the present invention can be employed in a wide variety of embodiments. The preferred and exemplary embodiments of the invention have been described in some detail, but it will be apparent to those skilled in the relevant art that some features which are not relevant to the invention may not have been described for the sake of clarity. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of doing business comprising the steps of:
   purchasing from an owner of a real property, in exchange for a consideration, an assignable entitlement to act as the owner's real estate agent when the owner sells the property, wherein said entitlement confers the right to a commission on the sale of the property;
   creating a pool consisting of the entitlement and at least one other entitlement to represent at least one other owner of at least one other real property; and
   determining a current value of the pool of entitlements from at least one of the current values of the individual entitlements;
   wherein at least part of one of said steps utilizes a computer.

2. The method of claim 1 further comprising the step of executing a legally binding document that places an encumbrance on the title of the real property requiring satisfaction of the entitlement.

3. The method of claim 1 further comprising the step of determining a current value of the entitlement from at least one of (a) the current value of the real property, (b) an estimated rate of appreciation in the value of the real property, and (c) an expected date of resale.

4. The method of claim 1 further comprising the step of selling the entitlement.

5. The method of claim 1 further comprising the step of selling at least a portion of the pool of entitlements.

6. The method of claim 1 wherein the consideration comprises money.

7. The method of claim 1 wherein the consideration is related to a credit card.

8. The method of claim 1 wherein the consideration comprises credit redeemable for designated goods or services.

9. The method of claim 1 wherein the consideration comprises at least one of a discount on a mortgage loan rate, a discount on mortgage loan fees, a credit applicable towards mortgage payments, and a grace period for paying mortgage payments.

10. The method of claim 1 wherein the real property is a residential property.

11. The method of claim 1 wherein the real property is a commercial property.

12. The method of claim 1 wherein the brokerage commission is approximately equal to 6 percent of the sale price of the real property.

13. The method of claim 3 wherein the current value of the real property is determined from at least one of: tax records, actual sale price records, local sale price records, local property valuations, average local sale price, median local sale price, and actual local brokerage commissions earned.

14. The method of claim 3 wherein the current value of the real property is determined from at least one of: (a) an average time between property sales, (b) an average time that a property spends on the market, (c) an average rate of appreciation in property value, and (d) an average rate of inflation.

15. The method of claim 3 wherein said step of determining a current value of the entitlement further comprises estimating the costs associated with providing brokerage services.

16. The method of claim 3 further comprising the step of estimating a risk associated with the entitlement from at least one of: (a) the estimated value of the entitlement, (b) the likelihood that the entitlement will be realized, (c) the estimated time until the entitlement will be realized, (d) the predicted rate of appreciation in the value of the property, and (e) the possibility that the property will suffer catastrophic damage.

17. The method of claim 1 wherein the current value of the pool of entitlements is determined from at least one of: tax records, actual sale price records, average sale price records, average property valuations, median sale price records, median property valuations, and average brokerage commissions earned.

18. The method of claim 1 wherein the current value of the pool of entitlements is determined from at least one of: (a) an average time between property sales, (b) an average time that a property spends on the market, (c) an average rate of appreciation in property value, and (d) an average rate of inflation.

19. The method of claim 1 wherein the risk associated with the pool of entitlements is estimated from at least one of: (a) the estimated value of the pool of entitlements, (b) the likelihood that the entitlements will be realized, (c) the expected number of entitlements within the pool that will be realized, (d) an estimated time until the entitlements will be realized, and (e) the predicted rate of appreciation in the values of the entitlements.

20. The method of claim 1 further comprising the step of creating a financial instrument, wherein the value of the instrument varies depending upon the value of the entitlement.

21. The method of claim 1 further comprising the step of creating a financial instrument, wherein the value of the instrument varies depending upon the value of at least a portion of the pool.

22. The method of claim 1 wherein the owner of the real property is a buyer of the real property and said step of purchasing the entitlement occurs at the time of closing of the purchase.

23. The method of claim 1 wherein at least a portion of said method is performed using an internet.

24. A method of doing business comprising the steps of:
purchasing from an owner of a real property, in exchange for a consideration, an assignable entitlement to act as the owner's real estate agent when the owner sells the property, wherein said entitlement confers the right to a commission on the sale of the property;
determining a cent value of the entitlement from at least one of: (a) the current value of the real proper, (b) an estimated rate of appreciation in the value of the real property, and (c) an expected date of resale; and
assessing a risk associated with the entitlement
wherein at least part of one of said steps utilizes a computer.

25. The method of claim 24 further comprising the step of executing a legally binding document that places an encumbrance on the title of the real property requiring satisfaction of the entitlement.

26. The method of claim 24 further comprising the step of selling the entitlement.

27. The method of claim 24 further comprising the step of creating a pool consisting of the entitlement and at least one other entitlement to represent at least one other owner of at least one other real property.

28. The method of claim 27 further comprising the step of determining a current value of the pool of entitlements from at least one of the current values of the individual entitlements, and the risk associated with the entitlements.

29. The method of claim 27 further comprising the step of selling at least a portion of the pool of entitlements.

30. The method of claim 24 wherein the consideration comprises money.

31. The method of claim 24 wherein the consideration is related to a credit card.

32. The method of claim 24 wherein the consideration comprises credit redeemable for designated goods or services.

33. The method of claim 24 wherein the consideration comprises at least one of a discount on a mortgage loan rate, a discount on mortgage loan fees, a credit applicable towards mortgage payments, and a grace period for paying mortgage payments.

34. The method of claim 24 wherein the real property is a residential property.

35. The method of claim 24 wherein the real property is a commercial property.

36. The method of claim 24 wherein the brokerage commission is approximately equal to 6 percent of the sale price of the real property.

37. The method of claim 24 wherein the current value of the real property is determined from at least one of: tax records, actual sale price records, local sale price records, local property valuations, average local sale price, median local sale price, and actual local brokerage commissions earned.

38. The method of claim 24 wherein the current value of the real property is determined from at least one of: (a) an average time between property sales, (b) an average time that a property spends on the market, (c) an average rate of appreciation in property value, and (d) an average rate of inflation.

39. The method of claim 24 wherein said step of determining a current value of the entitlement further comprises estimating the costs associated with providing brokerage services.

40. The method of claim 24 wherein the risk associated with the entitlement is estimated from at least one of: (a) the estimated value of the entitlement, (b) the likelihood that the entitlement will be realized, (c) the estimated time until the entitlement will be realized, (d) the predicted rate of appreciation in the value of the property, and (e) the possibility that the property will suffer catastrophic damage.

41. The method of claim 24 further comprising the step of creating a financial instrument, wherein the value of the instrument varies depending upon the value of the entitlement.

42. The method of claim 24 wherein the owner of the real property is a buyer of the real property and said step of purchasing the entitlement occurs at the time of closing of the purchase.

43. The method of claim 24 wherein at least a portion of said method is performed using an internet.

44. A method of doing business comprising the steps of:
purchasing from an owner of a real property, in exchange for a consideration, an assignable entitlement to act as the owner's real estate agent when the owner sells the property, wherein said entitlement confers the right to a commission on the sale of the property;
creating a pool consisting of the entitlement and at least one other entitlement to represent at least one other owner of at least one other real property; and determining a current value of the pool of entitlements from at least one of the current values of the individual entitlements, and a risk associated with the entitlements wherein at least part of one of said steps utilizes a computer.

45. The method of claim 44 further comprising the step of executing a legally binding document that places an encumbrance on the title of the real property requiring satisfaction of the entitlement.

46. The method of claim 44 further comprising the step of determining a current value of the entitlement from at least one of: (a) the current value of the real property, (b) an estimated rate of appreciation in the value of the real property, and (c) an expected date of resale.

47. The method of claim 44 further comprising the step of selling the pool of entitlements.

48. The method of claim 44 wherein the consideration comprises money.

49. The method of claim 44 wherein the consideration is related to a credit card.

50. The method of claim 44 wherein the consideration comprises credit redeemable for designated goods or services.

51. The method of claim 44 wherein the consideration comprises at least one of a discount on a mortgage loan rate, a discount on mortgage loan fees, a credit applicable towards mortgage payments, and a grace period for paying mortgage payments.

52. The method of claim 44 wherein the real property is a residential property.

53. The method of claim 44 wherein the real property is a commercial property.

54. The method of claim 44 wherein the brokerage commission is approximately equal to 6 percent of the sale price of the real property.

55. The method of claim 44 wherein the current value of the pool of entitlements is determined from at least one of: tax records, actual sale price records, average sale price records, average property valuations, median sale price records, median property valuations, and average brokerage commissions earned.

56. The method of claim 44 wherein the current value of the pool of entitlements is determined from at least one of: (a) an average time between property sales, (b) an average time that a property spends on the market, (c) an average rate of appreciation in property value, and (d) an average rate of inflation.

57. The method of claim 44 wherein said step of determining a current value of the pool of entitlements further comprises estimating the costs associated with providing brokerage services.

58. The method of claim 44 wherein the risk associated with the pool of entitlements is estimated from at least one of: (a) the estimated value of the pool of entitlements, (b) the likelihood that the entitlements will be realized, (c) the expected number of entitlements within the pool that will be realized, (d) an estimated time until the entitlements will be realized, and (e) the predicted rate of appreciation in the values of the entitlements.

59. The method of claim 44 further comprising the step of creating a financial instrument, wherein the value of the instrument varies depending upon the value of at least a portion of the pool.

60. The method of claim 44 wherein the owner of the real property is a buyer of the real property and said step of purchasing the entitlement occurs at the time of closing of the purchase.

61. The method of claim 44 wherein at least a portion of said method is performed using an internet.

* * * * *